US008559064B2

(12) United States Patent  
Inui

(10) Patent No.: US 8,559,064 B2  
(45) Date of Patent: Oct. 15, 2013

(54) CONTROLLING IMAGE PROCESSING FOR DATA TRANSMISSION

(75) Inventor: Mihoko Inui, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 528 days.

(21) Appl. No.: 12/923,190

(22) Filed: Sep. 8, 2010

(65) Prior Publication Data

US 2011/0063687 A1     Mar. 17, 2011

(30) Foreign Application Priority Data

Sep. 14, 2009   (JP) ................................ 2009-211525

(51) Int. Cl.  
*H04N 1/40* (2006.01)

(52) U.S. Cl.  
USPC ............................ 358/448; 358/449; 358/1.15

(58) Field of Classification Search  
USPC ........................... 358/400, 448, 449, 1.1, 1.15  
See application file for complete search history.

(56) References Cited

U.S. PATENT DOCUMENTS

| 7,397,575 | B2 * | 7/2008 | Sekiguchi ..................... 358/1.15 |
| 2003/0098789 | A1 | 5/2003 | Murakami et al. |
| 2006/0007481 | A1 | 1/2006 | Kato et al. |
| 2006/0082797 | A1 | 4/2006 | Gardner |

FOREIGN PATENT DOCUMENTS

| CN | 1496010 | 5/2004 |
| CN | 1719862 | 1/2006 |
| CN | 101150645 | 3/2008 |
| JP | 2005-064704 | 3/2005 |
| JP | 2008-167287 | 7/2008 |
| WO | WO 2006/044530 | 4/2006 |

OTHER PUBLICATIONS

Chinese Office Action mailed Nov. 13, 2012.

* cited by examiner

*Primary Examiner* — Thomas D Lee  
(74) *Attorney, Agent, or Firm* — Harness, Dickey & Pierce, P.L.C.

(57) ABSTRACT

An apparatus, system, and method of transmitting original image data are disclosed. According to section size information, dividing information of the original image data is generated. The original image data is classified into multiple sets of original image data files using the dividing information. A plurality of section image data files are generated from the multiple sets of original image data files. The plurality of section image data files is transmitted to a destination apparatus according to the dividing information.

12 Claims, 9 Drawing Sheets

FIG. 5

| JOB ID 510 | IMAGE ID 520 | TOTAL DATA SIZE 530 | TOTAL NO PROPERTY INFORMATION (total) 540 | SECTION NO PROPERTY INFORMATION (SectionNo) 550 |
|---|---|---|---|---|
| job_id_0001 | D:¥¥ImageFile¥scan_image_0001/ D:¥¥ImageFile¥scan_image_0002 | 1.5MB | 4 | 1 |
| job_id_0002 | D:¥¥ImageFile¥scan_image_0003/ D:¥¥ImageFile¥scan_image_0004 | 1.6MB | 4 | 2 |
| job_id_0003 | D:¥¥ImageFile¥scan_image_0005 | 1.0MB | 4 | 3 |
| job_id_0004 | D:¥¥ImageFile¥scan_image_0006 | 2.0MB | 4 | 4 |
| ... | ... | ... | ... | ... |

500

CONTROLLING IMAGE PROCESSING FOR DATA TRANSMISSION

CROSS-REFERENCE TO RELATED APPLICATIONS

This patent application is based on and claims priority pursuant to 35 U.S.C. §119 to Japanese Patent Application No. 2009-211525, filed on Sep. 14, 2009, in the Japanese Patent Office, the entire disclosure of which is hereby incorporated herein by reference.

FIELD OF THE INVENTION

The present invention generally relates to an apparatus, system, and method of controlling image processing for data transmission, and a recording medium storing instructions for controlling image processing for data transmission.

BACKGROUND

Recent image processing apparatuses, such as a multifunctional apparatus connected to a network, can transmit image data of an original to a data server through the network. For example, according to Japanese Patent Application Publication No. 2008-167287-A, an image processing apparatus scans a plurality of pages of original into original image data. The image processing apparatus divides the original image data into a plurality of section image data files according to a user instruction that defines a size of one section image data file to be generated. The image processing apparatus further transmits the plurality of section image data files to a destination server through the network.

Since the size of one section image data file is determined based on the user instruction, unless the user knows an appropriate section data size beforehand, the section image data may not be appropriately generated such that an error may occur. For example, the image processing apparatus divides the original image data into a plurality of section image data files such that each section image data file has a data size specified by the user. While this allows each section image data file to have a size equal to the specified data size, one page of the original image data may be divided into several pieces, as the image processing apparatus does not consider how the original image data should be divided. If one page of the original image data, which is divided into multiple pieces, is transmitted as more than one separate file, the destination server that receives the section image data files may not able to reconstruct the original image data from the section image data files, thus generating a file opening error.

SUMMARY

In view of the above, there is a need for a technique to appropriately define a size of each section image data file generated from the original image data as a result of dividing process.

Example embodiments of the present invention include an apparatus or a system that obtains original image data of an original, generates dividing information of the original image data according to section size information indicating a size of section image data to be generated from the original image data, classifies the original image data into multiple sets of original image data files using the dividing information, and generates a plurality of section image data files with each section image data file including one set of original image data files. The dividing information of the original image data includes: job identification information for identifying one set of original image data files and image data identification information, to be registered in association with the job identification information, for identifying each one of original image data files that are classified into the one set of original image data files.

Example embodiments of the present invention include a method of controlling image processing for data transmission, including: scanning an original into original image data; generating dividing information of the original image data according to section size information indicating a size of section image data to be generated from the original image data; classifying the original image data into multiple sets of original image data files using the dividing information; and generating a plurality of section image data files with each section image data file including one set of original image data files. The dividing information of the original image data includes: job identification information for identifying one set of original image data files and image data identification information, to be registered in association with the job identification information, for identifying each one of original image data files that are classified into the one set of original image data files.

In addition to the above-described example embodiments, the present invention may be practiced in various other ways, for example, as a computer-executable control program that cause a processor to perform the above-described method of controlling image processing, or a recording medium storing instructions that cause a processor to perform the above-described method of controlling image processing.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 is an example dividing information table stored in a dividing information database of the image processing apparatus of FIG. 1;

Figure 1:
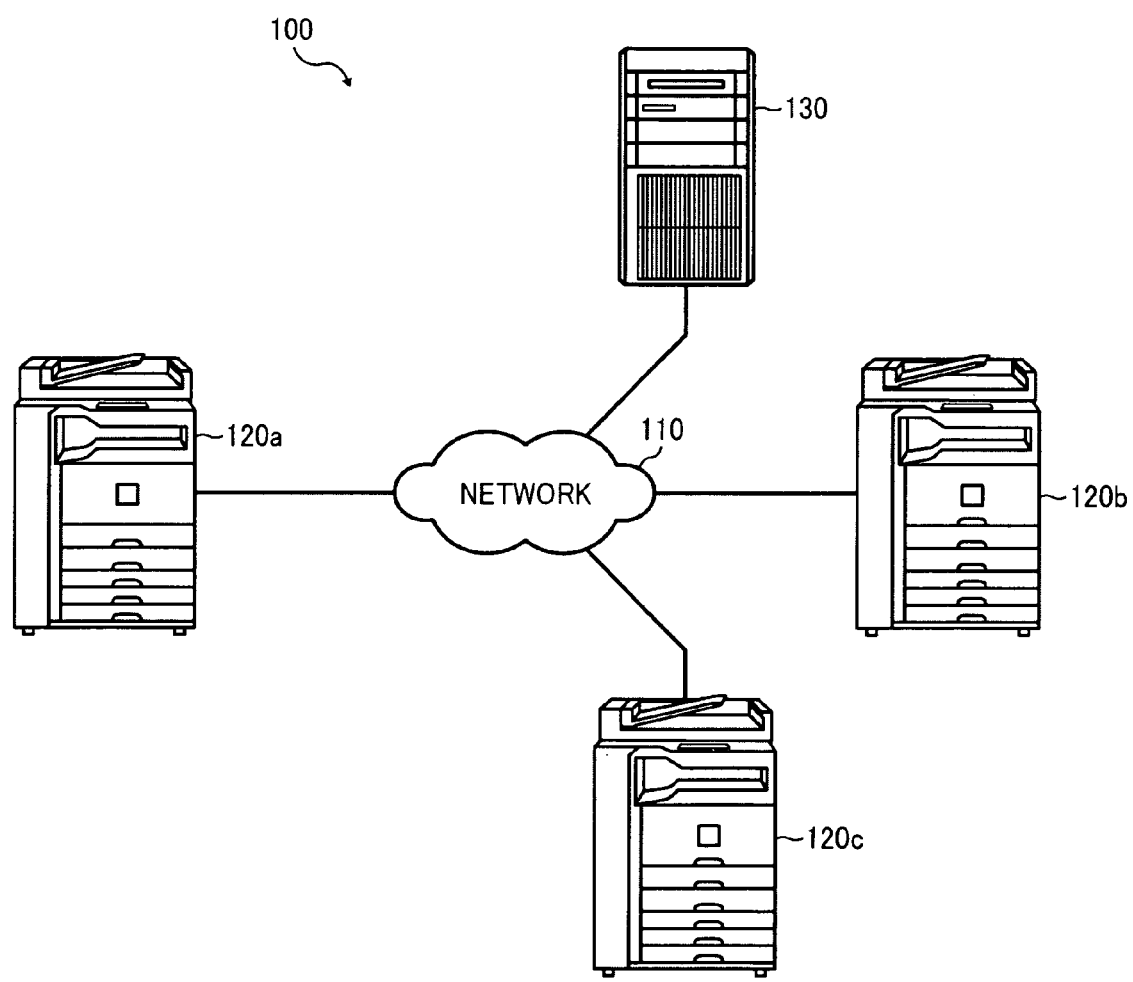
FIG. 1 is a schematic block diagram illustrating a configuration of an image transmission system including an image processing apparatus according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, an image transmission system 100 is explained according to an example embodiment of the present invention. The image transmission system 100 includes a plurality of image processing apparatuses 120a, 120b, and 120c, and a server 130, which are connected through a network 110. The network 110 may be implemented by, for example, a network in compliance with Ethernet and TCP/IP protocol. The network 110 may alternatively be implemented by a local area network (LAN).

The image processing apparatuses 120a, 120b, and 120c, which may be collectively referred to as the image processing apparatus 120, are each implemented by a multifunctional apparatus (MFP) including a scanner unit and a communication unit. The scanner unit may be implemented by any desired scanner unit capable of scanning using an imaging sensor such as a charged coupled device (CCD). The communication unit allows the image processing apparatus 120 to transmit data to any apparatus provided on the network 110 in any desired format.

In operation, the image processing apparatus 120 generates image data of an original using the scanner unit. The image processing apparatus 120 further causes the communication unit to send the original image data through the network 110 to the server 130. This operation of transmitting the original image data to a destination is controlled according to an image transmission control program. More specifically, the image processing apparatus 120 may download the image transmission control program from a management terminal provided on the network 110 through the network 110. According to the control program, the image processing apparatus 120 provides a user interface ("UI") to be displayed on a display unit, such as an operation panel, of the image processing apparatus 120. Through the UI, a user is able to instruct the image processing apparatus 120 to perform the operation of transmitting the image data to a desired destination. In alternative to displaying the UI on the operation panel, the image processing apparatus 120 may display the UI on a display unit of another apparatus such as a personal computer provided on the network 110.

In this example, the image processing apparatus 120 includes a processor and a memory, which together function as a controller unit. The memory includes, for example, a read only memory (ROM), a random access memory (RAM), and/or a hard disk device (HDD). The image transmission control program may be stored in the memory such as the ROM. Under control of the operating system (OS) such as UNIX or LINUX, the controller unit executes the image transmission control program to cause the image processing apparatus 120 to perform operation or function of controlling data transmission as described below. In this example, the control program may be written in any desired computer programming language such as assembler, C, C++, Java, Java Script, etc. Further, in this example, the image transmission control program may be previously stored in any memory accessible by the controller unit, which may be provided in the image processing apparatus 120 or outside the image processing apparatus 120.

In addition to the scanner unit, communication unit, and controller unit, the image processing apparatus 120 may include a printer unit, facsimile control unit, etc.

The server 130 includes a file server that stores the image data received from the image processing apparatus 120, and/or an email server that sends an electronic mail according to Simple Mail Transfer Protocol (SMTP) attached with the image data received from the image processing apparatus 120 to a destination specified by the user. The server 130 may be implemented by, for example, an information processing apparatus provided with a storage unit and a controller unit.

In addition to the image processing apparatus 120, and the server 130, the image transmission system of FIG. 1 may include any other apparatus, for example, a personal computer functioning as a client apparatus, and/or a computer functioning as the management terminal.

Figure 2:
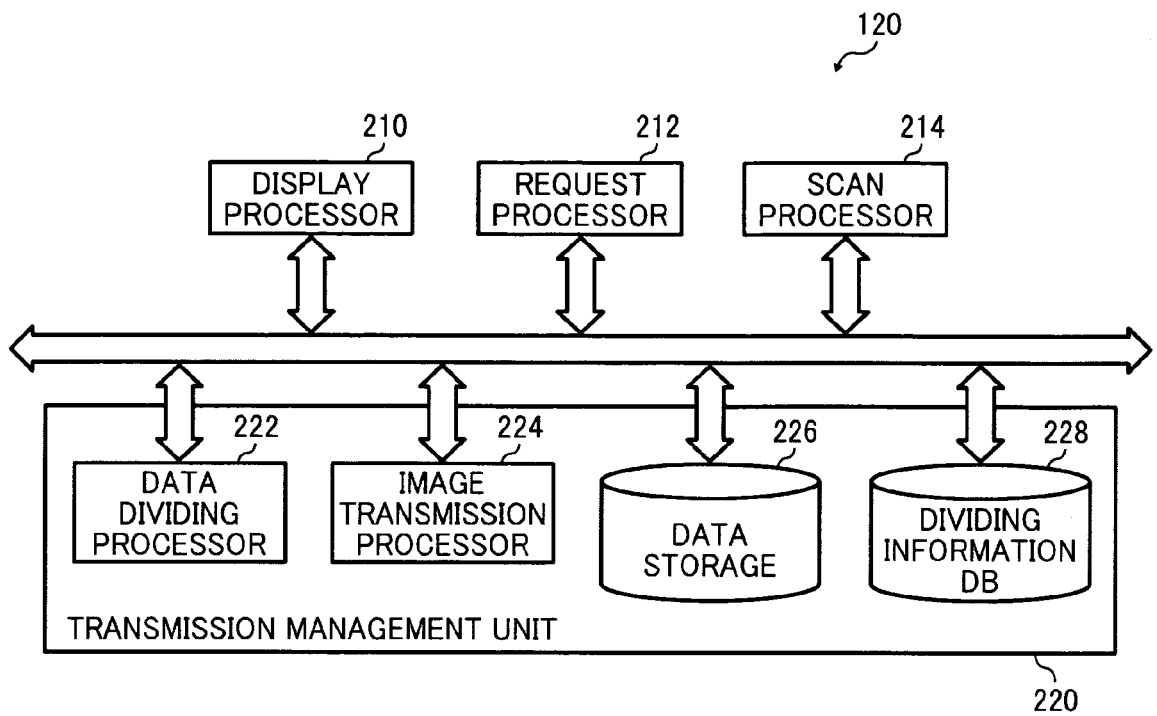
FIG. 2 is a schematic block diagram illustrating a functional structure of the image processing apparatus of FIG. 1.

Referring to FIG. 2, a functional structure of the image processing apparatus 120 is explained according to an example embodiment of the present invention. For example, upon execution of the image transmission control program, the controller unit of the image processing apparatus 120 is caused to have functional modules including a display processor 210, a request processor 212, a scan processor 214, and a transmission management unit 220. The transmission management unit 220 includes a data dividing processor 222, an image transmission processor 224, a data storage 226, and a dividing information database 228.

The display processor 210 causes the operation panel of the image processing apparatus 120 to display a user interface. Using the user interface displayed on the operation panel, the user instructs the image processing apparatus 120 to perform operation of transmitting the image data scanned from the original. At the time of instructing such operation, the user designates various settings information such as section size information indicating a size of section image data to be generated from the original image data, settings information regarding property information of the original image data, destination information to which the original image data is to be sent, information regarding confidentiality of the original image data, etc.

The request processor 212 receives a user instruction for performing operation of transmitting the original image data. In one example, the user instruction may be input by the user through the UI of the operation panel of the image processing apparatus 120. In another example, the user instruction may be input by the user through the UI of a display unit of a client PC provided on the network 110, and sent to the image processing apparatus 120. According to the user instruction, the request processor 212 causes the scan processor 214 to scan the original into the original image data using the scanner unit. The original image data is sent to the transmission management unit 220. The transmission management unit 220 stores the original image data in a storage unit provided in the transmission management unit 220, such as the data storage 226.

In this example, the user instruction for performing transmission operation includes section size information indicating a size of section data to be generated from the original image data, settings information regarding property information of the original image data, and destination information to which the original image data is to be sent. The section size information regarding the section data size is used when the data dividing processor 222 classifies the original image data into a plurality of sets of original image data, and divides the original image data into a number of section image data files such that each data file is generated based on each set of the plurality of sets of the original image data. The information regarding the section data size may be set by the user through the UI.

The property information of the original image data relates to the operation of dividing the original image data. In this example, the property information includes total number property information and section number property information. The total number property information indicates a number of section image data files generated from the original image data, or a number of sets of the original image data from which the section image data files are generated. The section number property information is used as identification information that uniquely identifies each one of the section image data files that are generated from the original image data.

The destination information of the original image data indicates a destination to which the original image data is transmitted. For example, the destination information may be expressed in the form of a path specifying a directory within the server 130 or a personal computer functioning as a client, or an email address to which an email attached with the original image data is transmitted.

When the scan processor 214 receives a user instruction for performing scanning operation, for example, through the request processor 212, the scan processor 214 causes the scanner unit of the image processing apparatus 120 to scan the original into scanned data, apply various image processing such as analog-to-digital conversion, level correction, gamma correction, and edge processing to the scanned data to generate the original image data. The original image data is stored in a memory such as a buffer memory, and sent to the transmission management unit 220 for further processing.

The transmission management unit 220 transmits the original image data to the destination such as the server 130 through the network 110, using the communication unit.

The data dividing processor 222 obtains the original image data from the data storage 226, and classifies the original image data into a plurality of sets or groups of original image data according to section size information. The section size information, which may be specified by the user, indicates a size of section data to be generated based on each set of original image data.

More specifically, the data dividing processor 222 generates dividing information, which specifies the process of dividing the original image data into a plurality of section image data files, according to the section size information. For example, the data dividing processor 222 generates a job ID, which is identification information that uniquely identifies each one of the sets of the original image data, and assigns the job ID to each one of the sets of the original image data. The data dividing processor 222 further generates, for each set of original image data files, a plurality of image IDs each of which uniquely identifies each one of the original image data files belonging to one set of original image data files. The data dividing processor 222 stores, in the dividing information DB 228, the image IDs assigned to a specific set of the original image data in association with the job ID that is assigned to the specific set of the original image data.

The data dividing processor 222 then divides the original image data into a plurality of section image data files according to the dividing information.

In this example, the data dividing processor 222 divides a plurality of pages of the original image data into a set of the original image data using the section size information indicating the section data size specified by the user. For example, the data dividing processor 222 may obtain the section size information indicating a threshold value of the section image data size, which is input by the user, from any desired memory or from the request processor 212. Based on the section data size specified by the user, the data dividing processor 222 generates dividing information of the original image data such that each section image data file generated from the original image data is equal to or less than the section data size specified by the user.

In another example, the data dividing processor 222 may determine a size of section image data according to the capabilities of a destination apparatus such as a server to which the original image data is transmitted. For example, the data dividing processor 222 may set a threshold value of a section data size differently based on the capabilities of the destination apparatus. More specifically, when the destination apparatus is capable of storing a large amount of data, the data dividing processor 222 sets a threshold value of the section data size to have the Mbyte file size. When the destination apparatus is not capable of storing a large amount of data, the data dividing processor 222 sets a threshold value of the section data size to have a file size of few to several hundreds of KByte.

More specifically, in one example, the image processing apparatus 120 previously stores information regarding a plurality of section data sizes that is previously determined respectively for a plurality of destinations that is registered in the image processing apparatus 120. Such information regarding different section data sizes may be stored in the form of setting files, for example, in any desired memory on the network 110. The data dividing processor 222 specifies a destination, such as the destination server, based on the destination information of the original image data, and selects a section data size that corresponds to the specified destination using the setting file. In another example, when the data dividing processor 222 determines that the original image data is to be sent to a specific email address based on the destination information of the original image data, the data dividing processor 222 may determine a size of section data to be a desired size previously determined for email transmission.

In another example, the data dividing processor 222 determines a section data size of the original image data according to network capabilities such as a data transmission speed of the network. For example, the data dividing processor 222 may set a threshold value of a section data size differently based on the network capabilities of the system. In such case, the image processing apparatus 120 previously stores information regarding a plurality of section data sizes that is previously determined respectively for a plurality of network capabilities levels. Such information regarding different section data sizes may be stored in the form of setting files, for example, in any desired memory on the network 110. The data dividing processor 222 refers to the setting file to select the section data size according to the network capabilities of the system.

The image transmission processor 224 transmits the original image data to a destination, such as the server 130, using the dividing information registered in the dividing information DB 228. The image transmission processor 224 refers to the dividing information DB 228 to obtain a set of original image data files for each of job IDs from the data storage 226, and transmits the set of original image data files, one set by one set, according to the job ID. In addition to using the job ID in the process of transmitting the original image data, the user may check whether each set of the original image data has been sent by referring to the job ID stored in the dividing information DB 228.

The data storage 226 stores the original image data obtained by the scanning unit through scanning. The data storage 226 may be implemented by, for example, a non-volatile memory such as EPROM or EEPROM, or a storage device such as a HDD. The dividing information DB 228 stores therein dividing information generated by the data dividing processor 222. The dividing information stored in the dividing information DB 228 may be deleted, for example, at the time the image transmission processor 224 completes transmission of the original image data to the server 130. Alternatively, the dividing information stored in the dividing information DB 228 may be kept in the dividing information DB 228 as log data.

Further, in this example, the user may specify, through the UI, that the contents of original image data is confidential. In such case, the request processor 212 sends setting information specifying that the original image data includes confidential information, together with the user instruction for performing the transmission process, to the transmission management unit 220. When the setting information indicating that the original image data includes confidential information is received, the data dividing processor 222 transmits the original image data, which is not divided, to the server 130. Accordingly, the data dividing processor 222 does not generate dividing information, even when the user instruction requests to divide the original image data. In another example, when the setting information indicating that the original image data contains confidential information is input through the UI, the UI displayed by the image processing apparatus 120 may update the UI so as to prohibit the user from inputting the user instruction for performing the process of dividing the original image data.

In alternative to receiving the settings information indicating whether the original image data is confidential or not from the user through the UI, the image processing apparatus 120 may receive such information regarding confidentiality of the original image data from the original image data itself. For example, the original image data may be embedded with a mark indicating that the original image data is confidential. When the image processing apparatus 120 detects such mark indicating confidentiality of the original image data, the image processing apparatus 120 does not generate dividing information such that the original image data is sent as one file.

Further, when the original image data is transmitted as one file as the original image data contains confidential information, the original image data may be converted to a data format that is more secure.

Figure 3:
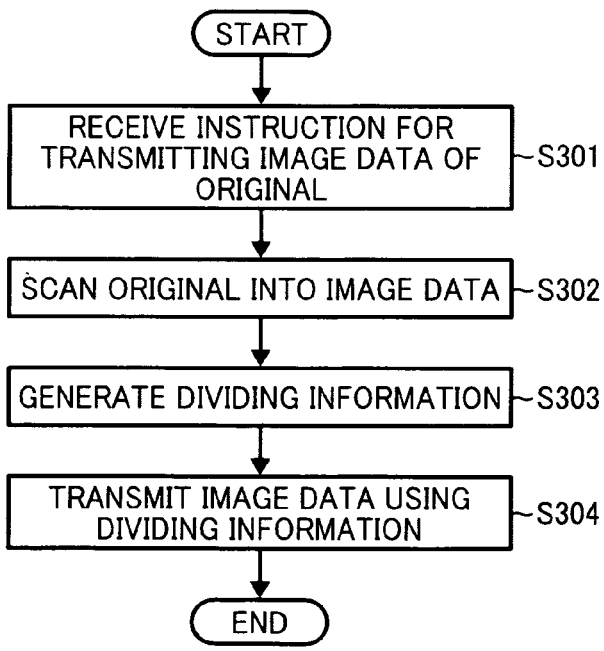
FIG. 3 is a flowchart illustrating operation of transmitting image data, performed by the image processing apparatus of FIG. 1, according to an example embodiment of the present invention.

Referring now to FIG. 3, operation of transmitting the original image data, performed by the image processing apparatus 120, is explained according to an example embodiment of the present invention. The operation of FIG. 3 may be performed when the image processing apparatus 120 receives a user instruction for transmitting the original image data.

At S310, when the request processor 212 of the image processing apparatus 120 receives the user instruction for transmitting the original image data, the request processor 212 sends an instruction for scanning the original into the original image data to the scan processor 214.

At S302, the scan processor 214 generates the original image data by scanning the original, and sends the original image data to the transmission management unit 220.

At S330, the data dividing processor 222 of the transmission management unit 220 generates the dividing information of the original image data. The dividing information is stored in a memory such as the dividing information DB 228. According to the dividing information, the data dividing processor 222 divides the original image data into a plurality of sets of original image data files, and generates a plurality of section image data files respectively based on the plurality of sets of original image data files.

At S304, the image transmission processor 224 of the transmission management unit 220 transmits the original image data to the server 130 according to the dividing information generated by the dividing processor 222, and the operation ends. More specifically, the plurality of section image data files that is generated by dividing the original image data is sent, one file by one file, according to the dividing information.

Figure 4A:
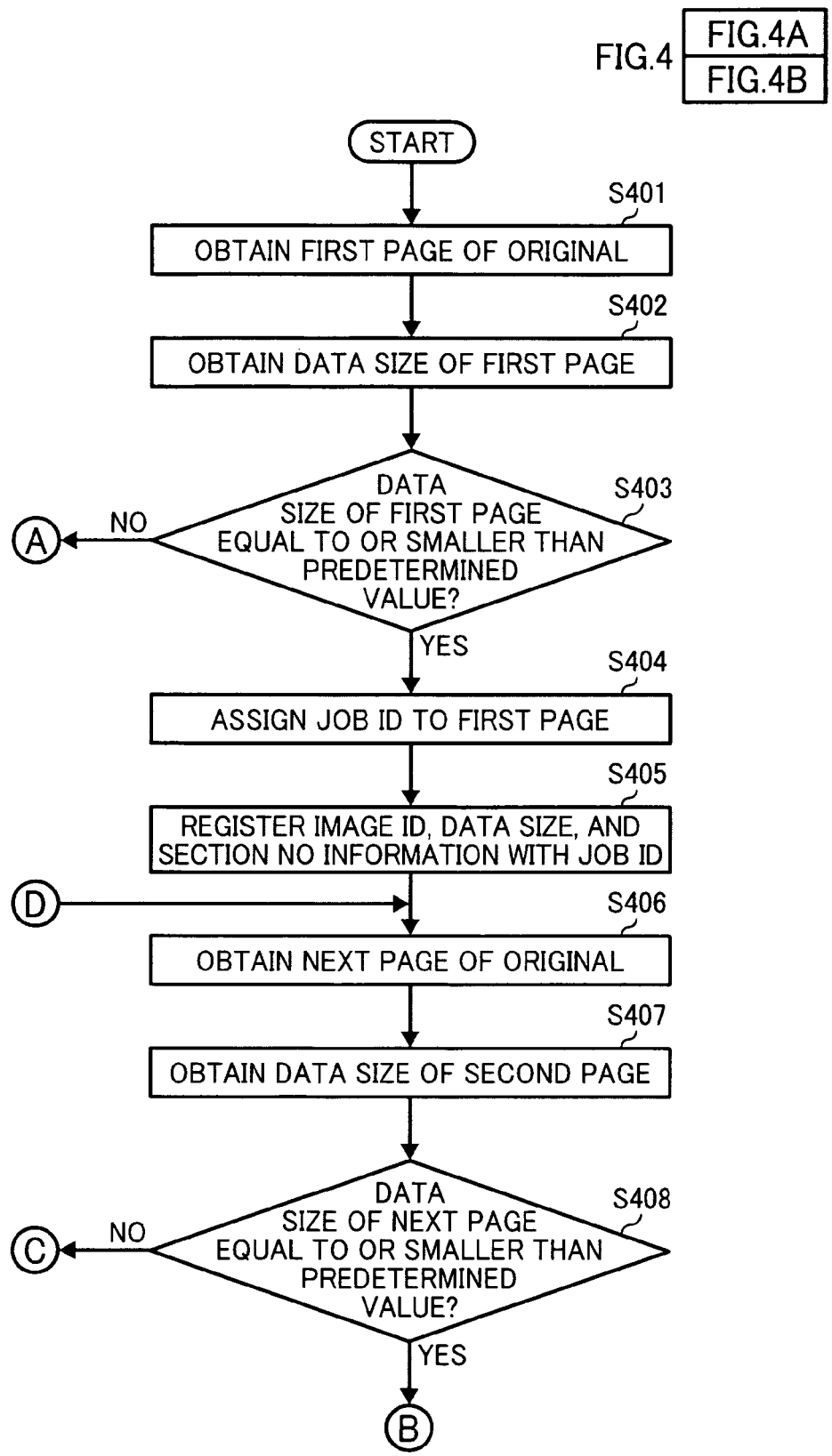
FIG. 4 is a flowchart illustrating operation of generating dividing information, performed by the image processing apparatus of FIG. 1, according to an example embodiment of the present invention.
Figure 4B:
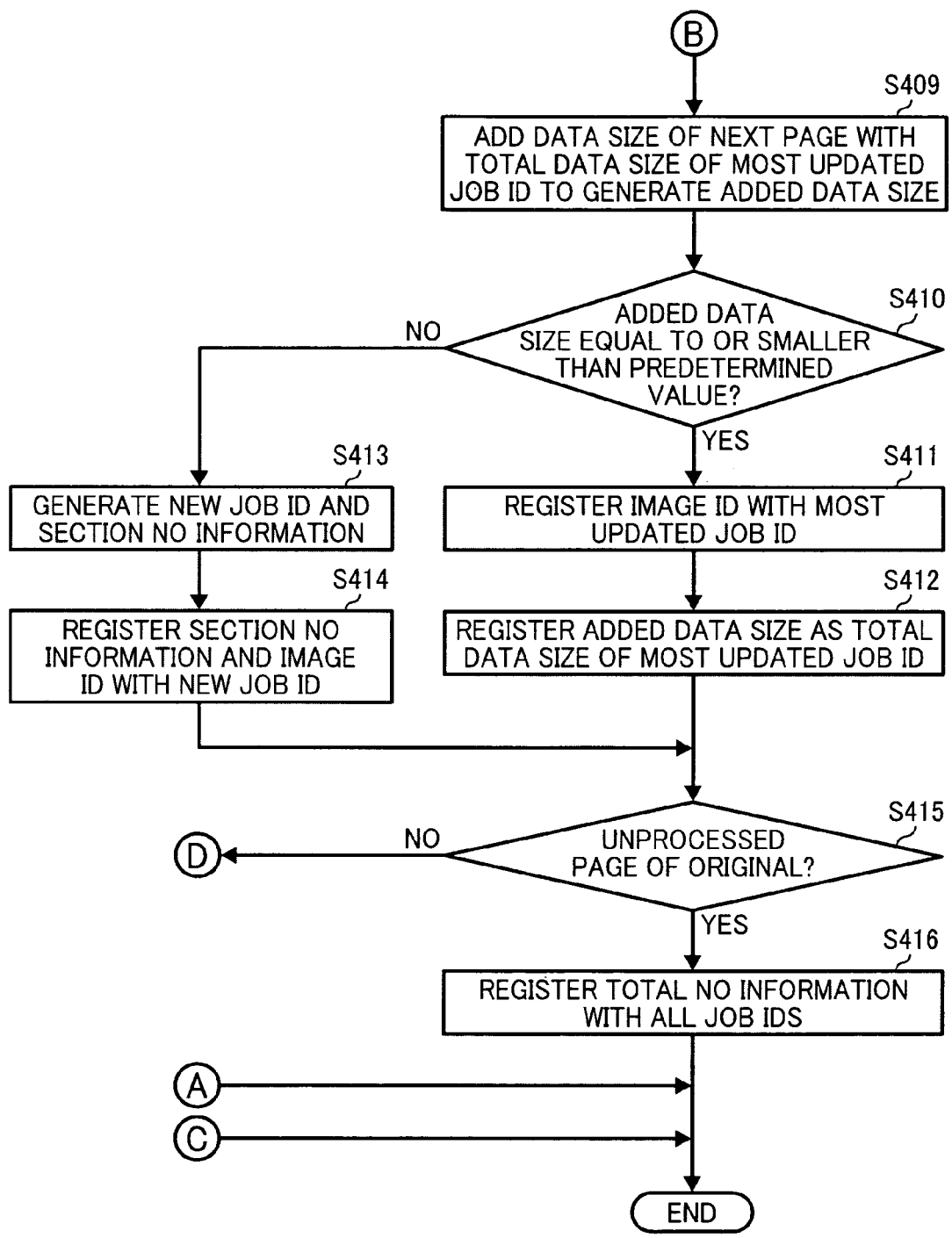

Referring now to FIG. 4, operation of generating dividing information of the original image data, performed by the data dividing processor 222, is explained according to an example embodiment of the present invention. The operation of FIG. 4 is performed at S330 of FIG. 3. More specifically, when the transmission management unit 220 receives the original image data for transmission, the transmission management unit 220 calls the data dividing processor 222 to perform operation of FIG. 4. Further, in this example, it is assumed that the original image data includes a plurality of pages of original image data.

At S401, the data dividing processor 222 obtains the first page of the original image data from the data storage 226.

At S402, the data dividing processor 222 obtains a size of the first page of the original image data obtained at S401. The size of the first page of the original image data may be obtained, for example, by referring to property information of the first page of the original image data.

At S403, the data dividing processor 222 determines whether the size of the first page of the original image data obtained at S402 is equal to or less than a threshold value of a section data size that is previously set. When it is determined that the size of the first page of the original image data is equal to or less the threshold value ("YES" at S403), the operation proceeds to S404. When it is determined that the size of the first page of the original image data is greater than the threshold value ("NO" at S403), the operation proceeds to S417 to end the process. At S417, the image processing apparatus 120 may display an error message indicating that the target original image data file cannot be divided. In this example, it is assumed that the threshold value of the section data size is previously set by the user through the UI of the image processing apparatus 120. Alternatively, as described above, the threshold value of the section data size may be set by the image processing apparatus 120 according to information regarding the destination apparatus to which the original image data is transmitted or the network capabilities of the system. Further, it is assumed that the threshold value that is previously set is stored in a memory of the image processing apparatus 120, once it is obtained by the image processing apparatus 120.

At S404, the data dividing processor 222 assigns a job ID to the first page of the original image data obtained at S401. The job ID may be stored as a part of the dividing information in the dividing information DB 228.

At S405, the data dividing processor 222 registers the image ID assigned to the first page of the original image data, the data size of the first page of the original image data, and the section number property information, in association with the job ID assigned at S404, in the dividing information DB 228. As described above, the section number property information is used to identify a specific section image data file out of a plurality of section image data files generated from the original image data.

At S406, the data dividing processor 222 obtains a next page of the original image data from the data storage 226, as a target page for processing.

At S407, the data dividing processor 222 obtains a size of the target page of the original image data received at S406.

At S408, the data dividing processor 222 determines whether the size of the target page of the original image data obtained at S407 is equal to or less than the threshold value of the section data size that is previously set. When it is determined that the size of the target page of the original image data is equal to or less the threshold value ("YES" at S408), the operation proceeds to S409. When it is determined that the size of the target page of the original image data is greater than the threshold value ("NO" at S408), the operation proceeds to S417 to end the operation. As described above, the image processing apparatus 120 may display an error message indicating that the target original image data file cannot be divided.

At S409, the data dividing processor 222 refers to the dividing information DB 228 to obtain a total data size of the set of original image data files that is associated with the most updated job ID. In this example, the most updated job ID refers to the job ID that is created for the page that has been processed just before the target page. Further, at S409, the data dividing processor 222 adds the obtained total data size with the data size of the target page of the original image data that is obtained at S407 to obtain the added data size. The added data size thus reflects a most updated section data size of the most updated job ID.

At S410, the data dividing processor 222 determines whether the added data size obtained at S409 is equal to or less than the threshold value of section data size. When it is determined that the size of the added data size is equal to or less the threshold value ("YES" at S410), the operation proceeds to S411. When it is determined that the added data size is greater the threshold value ("NO" at S410), the operation proceeds to S413.

At S411, the data dividing processor 222 registers the image ID assigned to the target page of the original image data in association with the most updated job ID, in the dividing information DB 228.

At S412, the data dividing processor 222 registers, in the dividing information DB 228, the added data size obtained at S409 in association with the most updated job ID as the total data size of the section image data.

At S413, the data dividing processor 222 generates a new job ID and new section number property information.

At S414, the data dividing processor 222 registers, in the dividing information DB 228, the image ID assigned to the target page of the original image data, and the section number property information generated at S413, in association with the new job ID generated at S413.

At S415, the data dividing processor 222 refers to the data storage 226 to determine whether there is any unprocessed page of the original image data. When it is determined that there is an unprocessed page of the original image data ("YES" at S415), the operation returns to S406 to obtain a next page of the original image data as a target page for processing. When it is determined that there is no unprocessed page of the original image data ("No" at S415), the operation proceeds to S416.

At S416, the data dividing processor 222 registers, in the dividing information DB 228, the total number property information of the original image data in association with all job IDs that are generated for the original image data that have been processed, and the operation ends. The total number property information indicates a total number of sets of original image data files that are classified from the original image data. The total number property information thus reflects a total number of section image data files generated from the original image data as a result of dividing process.

Referring to FIG. 5, example dividing information generated by the data dividing processor 222 is explained. In this example, the data dividing processor 222 stores the dividing information in the dividing information DB 228 in the form of a dividing information table 500 of FIG. 5.

The dividing information table 500 includes a job ID field 510, an image ID field 520, a total data size field 530, a total number property information field 540, and a section number property information field 550.

The job ID field 510 stores therein identification formation that uniquely identifies a set of original image data files generated from the original image data. In the example illustrated in FIG. 5, the job ID field 510 stores a plurality of job IDs named with "job_id_0001", "job_id_0002", "job_id_0003", "job_id_0004", etc. The job ID, or the identification information for identifying a set of original image data files, may be expressed in any other desired numeral or character.

The image ID field 520 stores therein identification information that uniquely identifies a specific original image data file that belongs to the set of original image data files specified by the corresponding job ID. In the example illustrated in FIG. 5, for the set of original image data specified by the job ID "job_id_0001", the image ID field 520 stores an image ID for each of two original image data files that belong to the set of original image data specified by the job ID "job_id_0001". In this example, the image ID is expressed in the form of a path of the original image data, that is, "D:¥¥ImageFile¥scan_image_0001" for the first page of the original image data, and "D:¥¥ImageFile¥scan_image_0002" for the second page of the original image data.

The total data size field 530 stores therein a total data size of the original image data files that belong to the set of the original image data specified by the corresponding job ID. The total data size stored in the total data size field 530 thus indicates the total data size of section image data generated based on the set of the original image data specified by the corresponding job ID. In the example illustrated in FIG. 5, the total data size of the set of original image data assigned with the job ID "job_id_0001" is 1.5 MB. The total data size of the set of original image data assigned with the job ID "job_id_0002" is 1.6 MB. The total data size of the set of original image data assigned with the job ID "job_id_0003" is 1 MB. The total data size of the set of original image data assigned with the job ID "job_id_0004" is 2 MB.

The total number property information field 540 registers therein total number property information of the original image data, which indicates a total number of section image data files generated from the original image data. In the example illustrated in FIG. 5, the total number property information of "4" is stored. This indicates that the original image data is divided into four section image data files based on four sets of original image data.

The section number property information field 550 stores therein section number property information that identifies a specific section image data generated from the original image data, or a specific set of original image data classified from the original image data, for the corresponding job ID. In the example illustrated in FIG. 5, the section number property information is expressed in the form of numeral 1, 2, 3, or 4. Alternatively, the section number property information may be expressed in any desired form.

With the section number property information and the total number property information, the section image data of the original image data can be defined. More specifically, in this example, the section number property information of "1" indicates that the corresponding section image data file is the first file out of four files that should be placed first. The section number property information of "2" indicates that the corresponding section image data file is the second file out of four files that should be placed second. The section number property information of "3" indicates that the corresponding section image data file is the third file out of four files that should be placed third. The section number property information of "4" indicates that the corresponding section image data file is the third file out of four files that should be placed fourth.

In addition or alternative to the total number property information and/or the section number property information, the dividing information may include any desired type of property information of the original image data such as date information indicating a date when the original image data is created, author information indicating an author of the original image data, and version information indicating a version of the original image data.

Figure 6A:
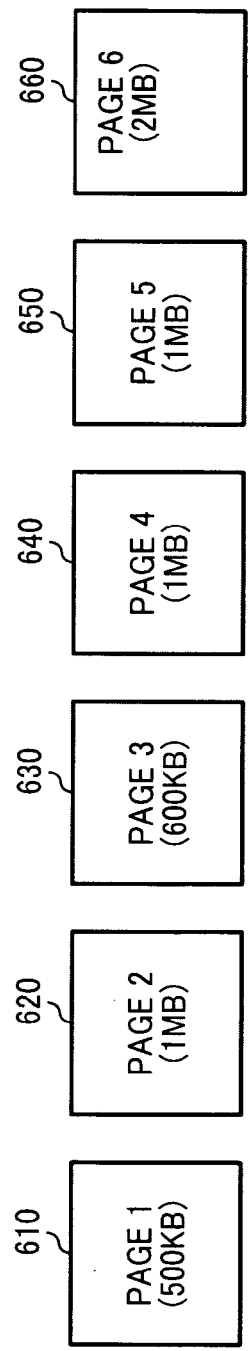
FIG. 6 is an illustration for explaining operation of dividing the original image data.
Figure 6B:
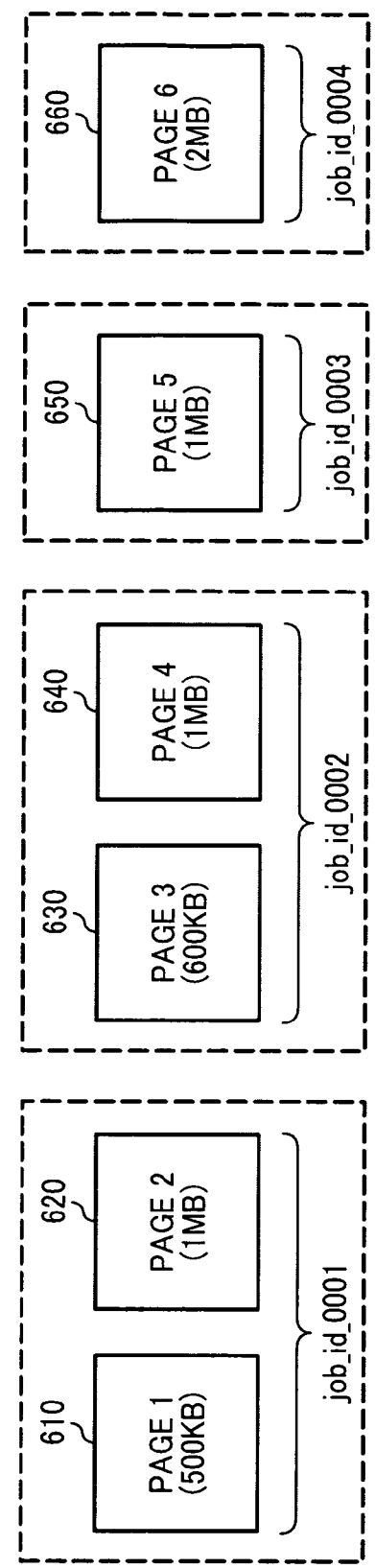

Referring now to FIGS. 6A and 6B, operation of dividing the original image data into a plurality of section image data files using dividing information is explained according to an example embodiment of the present invention. FIG. 6A illustrates the original image data before the dividing process. FIG. 6B illustrates a plurality of section image data files of the original image data after the dividing process.

Referring to FIG. 6A, the original image data includes six pages of original image data 610, 620, 630, 640, 650, and 660, which are obtained through scanning. The first page 610 of the original image data has a data size of 500 KB. The second page 620 of the original image data has a data size of 1 MB. The third page 630 of the original image data has a data size of 600 KB. The fourth page 640 of the original image data has a data size of 1 MB. The fifth page 650 of the original image data has a data size of 1 MB. The sixth page 660 of the original image data has a data size of 2 MB.

In this example, a threshold value of section data size is previously set to 2 MB. According to this threshold value, the data dividing processor 222 classifies the original image data into four sets or groups as illustrated in FIG. 6B. More specifically, the data dividing processor 222 classifies the original image data such that a total data size of original image data files belonging to each set of original image data is equal to or less than the threshold value of 2 MB. Further, the data dividing processor 222 assigns the job ID to each set of the original image data. More specifically, in FIG. 6B, the first set assigned with the job ID "job_id_0001" includes the first page 610 and the second page 620, with the total data size of 1.5 MB. The second set assigned with the job ID "job_id_0002" includes the third page 630 and the fourth page 640, with the total data size of 1.6 MB. The third set assigned with the job ID "job_id_0003" includes the fifth page 650, with the total data size of 1 MB. The fourth set assigned with the job ID "job_id_0004" includes the sixth page 660, with the total data size of 2 MB.

The image transmission processor 224 transmits the original image data, one set by one set, to the server 130, according to the job ID.

Figure 7:
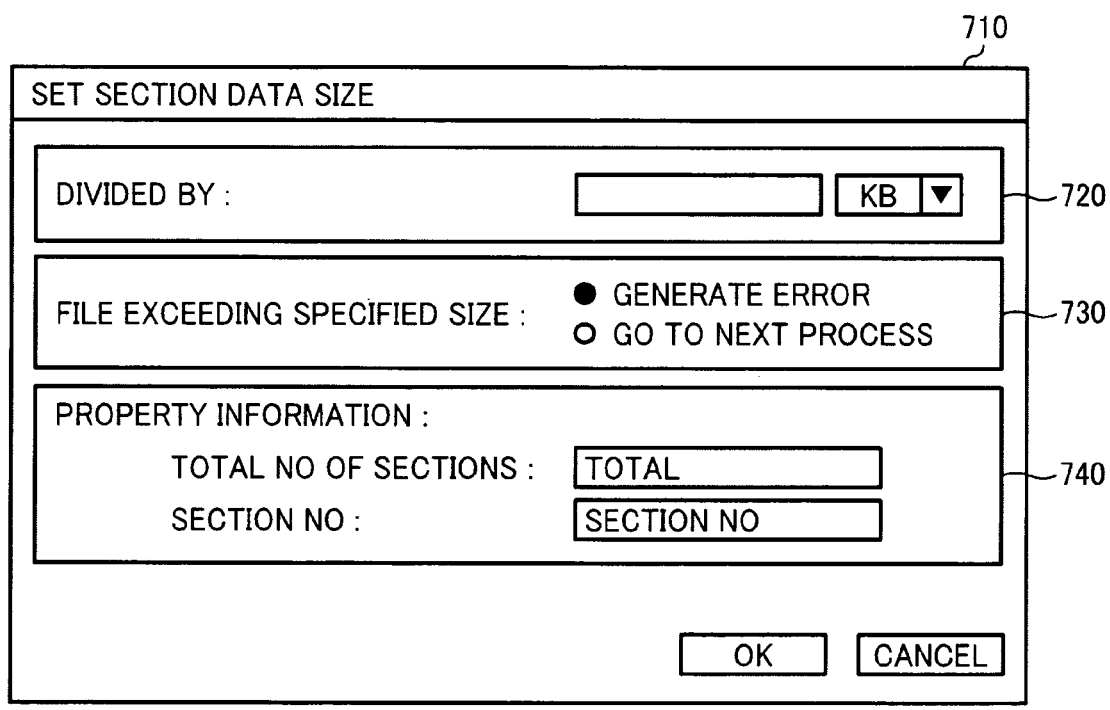
FIG. 7 is an example user interface that allows a user to set a size of section data to be generated from the original image data, provided by the image processing apparatus of FIG. 1.

Referring now to FIG. 7, operation of setting a section data size is explained according to an example embodiment of the present invention. FIG. 7 illustrates an example section size setting user interface 710 provided by the image processing apparatus 120 for allowing the user to set the section data size.

The section size setting UI 710 is one of the user interfaces that may be displayed on the operation panel of the image processing apparatus 120, which allows the user to set a threshold value of the section data size. The section size setting UI 710 includes a filed 720, a field 730, and a field 740. Further, section size setting UI 710 includes a "OK" button and a "CANCEL" button.

The field 720 allows the user to specify a threshold value of section data size of the original image data. The user may input any desired number in this field 720 using, for example, an input device such as a keyboard or a ten-key of the operation panel. Further, the user may select a unit of data size, such as KB or MB, using a pull-down box.

The field 730 allows the user to select specific processing when the image processing apparatus 120 determines that one original image data file of the original image data, such as one page of the original image data, has a data size that exceeds the threshold value of the section data size specified through the field 720. Referring to FIG. 7, the user may select either one of a first option "GENERATE ERROR" and a second option "GO TO NEXT PROCESS".

When the first option is selected, the image processing apparatus 120 generates an error message when the original image data file has a size greater than the data size specified through the field 720, without dividing the original image data file.

When the second option is selected, the image processing apparatus 120 proceeds with operation of dividing the original image data into a plurality of sets of section image data files without generating an error message. More specifically, the image processing apparatus 120 puts the original image data file that exceeds the threshold value of section data size, without dividing, as one of the section image data files to be generated from the original image data. In such case, the original image data may include at least one section image data file that exceeds the threshold value of section data size.

The field 740 allows the user to input settings information regarding property information of the original image data. For example, the user may input any desired numeral or character to specify a naming rule to be used for generating the total number property information or the section number property information. When the user leaves this field 740 blank, the image processing apparatus 120 may use a naming rule that is set by default.

As described above referring to FIGS. 1 to 7, the image processing apparatus 120 is provided with the image transmission control program, which causes the image processing apparatus 120 to perform operation of managing transmission of the original image data. In this example, the image processing apparatus 120 generates dividing information according to section size information indicating a size of section image data to be generated from the original image data, before performing the operation of generating section image data files or transmitting section image data files. The dividing information of the original image data is generated such that each section image data file has a size determined by the section size information. Further, when the original image data file cannot be divided, for example, as the original image data file has a size that exceeds the threshold value, the image processing apparatus 120 does not divide the original image data file. More specifically, the new job ID or the new image ID for the original image data file that exceeds the threshold value is not generated. With the dividing information, the image processing apparatus 120 divides the original image data into a plurality of section image data files without dividing one original image data file into pieces. Accordingly, an error, such as a file opening error, of the resultant section image data file is suppressed even when the user does not appropriately set a threshold value of the section image data file.

Further, in one of the above-described examples, the section size information may be set according to the destination information indicating a destination to which the original image data is transmitted. For example, the image processing apparatus 120 may set a threshold value of section image data according to information regarding a memory requirement of the destination apparatus, thus effectively managing a memory resource of the system.

Further, in one of the above-described examples, the section size information may be set according to the capabilities of network. For example, if the user sets a threshold value of section image data that is too small, a number of data files to be transmitted through the network increases, thus causing the network traffic to increase. If the user sets a threshold value of section image data that is too large, the network may not be able to transmit the large-size data such that a transmission error may occur. In view of this, the image processing apparatus 120 is able to set a threshold value of section image data according to the network capabilities, thus suppressing an error in data transmission.

The image processing system of FIG. 1 may be implemented in various other ways. For example, the original image data may be obtained in various other ways. In one example, the image processing apparatus 120 may obtain the original image data of the original, in electronic form, from another apparatus on the network 110 such as the client apparatus. In another example, the image processing apparatus 120 may obtain the original in the form of facsimile data from a facsimile apparatus that may be provided on the network 100.

In another example, in alternative to embedding the image transmission control program in the image processing apparatus 120, the image transmission control program may be embedded in an information processing apparatus functioning as a management server.

Figure 8:
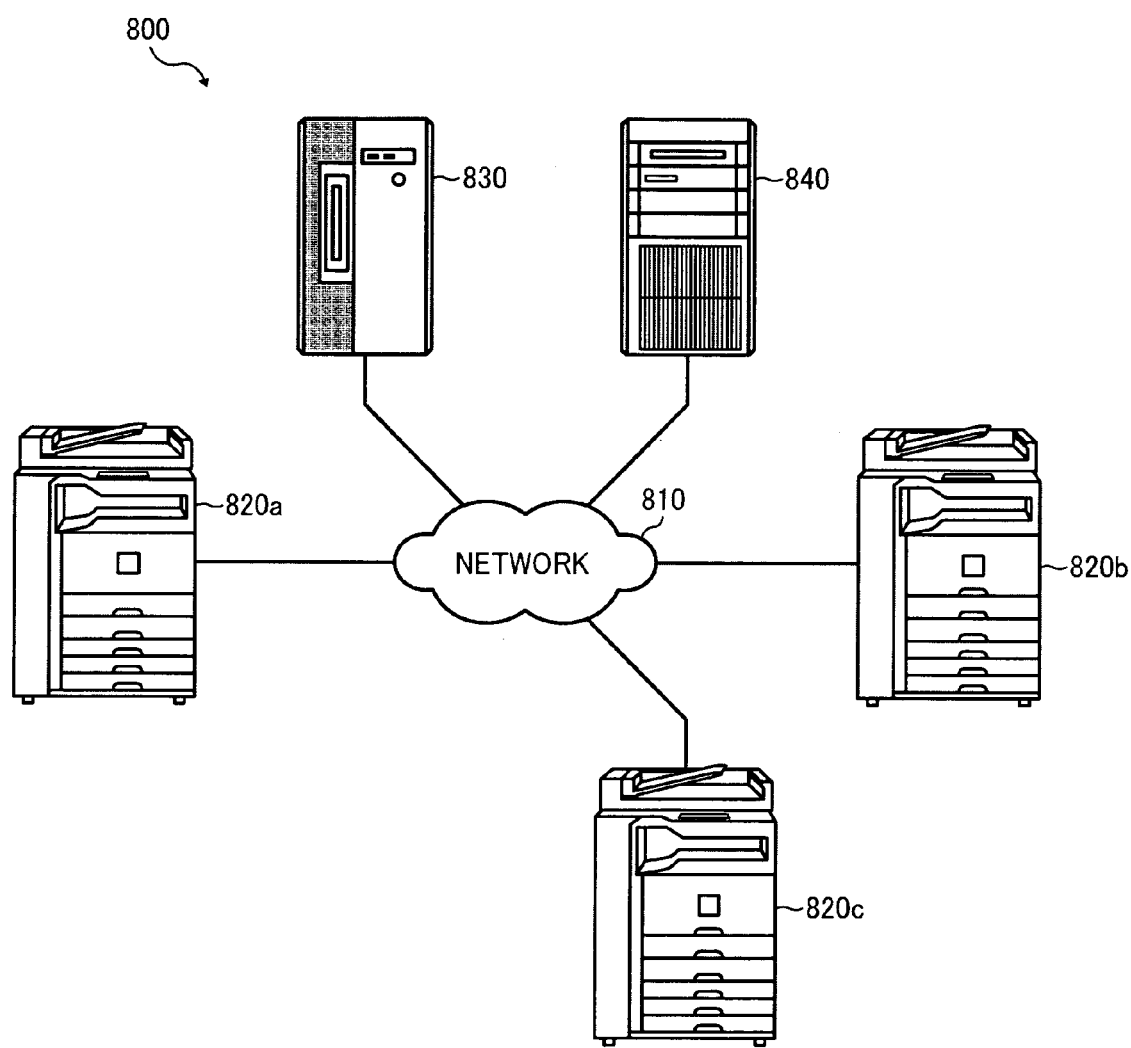
FIG. 8 is a schematic block diagram illustrating a configuration of an image transmission system including an image processing apparatus, according to an example embodiment of the present invention.

Referring now to FIG. 8, an image transmission system 800 is explained according to an example embodiment of the present invention. The image transmission system 800 includes a plurality of image processing apparatuses 820*a*, 820*b*, and 820*c*, a transmission management server 830, and a server 840, which are connected through a network 810. In this example, the function of the transmission management unit 220 of FIG. 2 is performed by the transmission management server 830.

Figure 9:
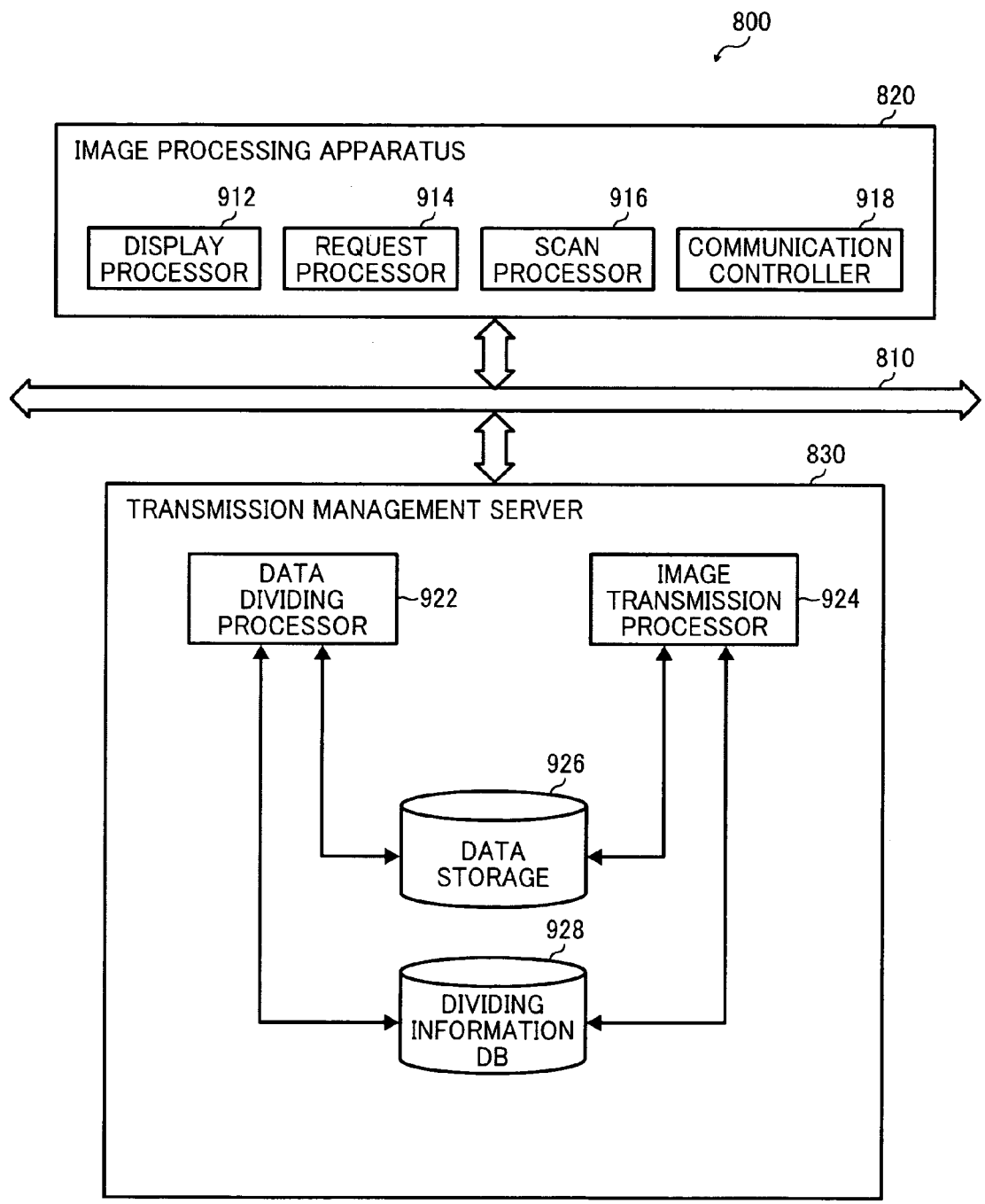
FIG. 9 is a schematic block diagram illustrating a functional structure of the image processing apparatus of FIG. 8, according to an example embodiment of the present invention.

The image processing apparatuses 820*a*, 820*b*, and 820*c*, which may be collectively referred to as the image processing apparatus 820, are each implemented by a multifunctional apparatus (MFP) including a scanner unit and a communication unit. In this example, the image processing apparatus 820 scans an original into original image data using the scanner unit, and transmits the original image data using the communication unit to the transmission management server 830. As illustrated in FIG. 9, the image processing apparatus 820 includes a display processor 912, a request processor 914, a scan processor 916, and a communication controller 918.

The transmission management server 830 receives the original image data from the image processing apparatus 820 through the network 810, generates dividing information of the original image data, divides the original image data into a plurality of sets of section image data files according to the dividing information, and transmits the plurality of sets of section image data files to a destination such as the server 840.

In this example, the transmission management server 830 executes the image transmission control program under control of the OS such as Windows 200× server, UNIX, LINUX, etc., using a Pentium or Pentium compatible processor. More specifically, the transmission management server 830 includes a processor, and a memory such as a RAM that functions as a work area of the processor and/or a HDD storing programs or data. Upon execution, the processor of the transmission management server 830 is caused to have functional modules illustrated in FIG. 9.

Referring to FIG. 9, the transmission management server 830 includes a data dividing processor 922, an image transmission processor 924, a data storage 926, and a dividing information database 928.

In operation, the request processor 922 receives a user instruction for performing operation of transmitting the original image data, for example, through a UI displayed through a display unit under control of the display processor 922. The user instruction may include various information such as section size information indicating a section data size of the original image data, destination information indicating a destination to which the original image data is transmitted, settings information regarding property information of the original image data, and information indicating whether the original image data is confidential. The scan processor 916 generates original image data using the scanner unit. The communication controller 918 transmits the original image data to the transmission management server 830 through the network 810, together with various information input as the user instruction. The settings information input through the user instruction may be sent, for example, in the form of setting file generated by the image processing apparatus 820.

The transmission management server 830 stores the original image data in the data storage 926. The transmission management server 830 calls the data dividing processor 922 to generate dividing information of the original image data based on various information input through the user instruction such as section data size information or settings information regarding property information. The image transmission processor 924 transmits the original image data to a destination such as the server 840, one section image data file by one section image data file, using the dividing information.

The image processing system 800 of FIG. 8 may be implemented in various other ways. For example, in alternative to transmitting the original image data to the server 840, the transmission management server 830 may send the original image data back to the image processing apparatus 820 together with the dividing information of the original image data. Further, the dividing information generated for the original image data may be stored in a memory such as the dividing information DB 928 in association with the original image data. By relating the dividing information with the original image data itself, the dividing information may be referred to at a later time such that the dividing information does not have to be generated.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in: an image processing apparatus for transmitting original image data. The image processing apparatus includes: means for scanning an original into the original image data; and means for dividing the original image data into multiple sets of original image data files according to a predetermined data size. The means for dividing generates a job ID that uniquely identifies each set of the original image data files each set including at least one original image data file, and registers image data identification information that uniquely identifies each image data file included in each set of the original image data files in association with the job ID. The image processing apparatus further includes: means for transmitting the multiple sets of original image data files, set by set, according to the job ID.

In one example, the means for dividing determines the data size used for dividing the original image data according to a user instruction input by a user, network capabilities, or capabilities of a server to which the original image data is transmitted.

In one example, the image processing apparatus further includes: means for displaying a user interface that allows the user to input a user instruction for performing operation of transmitting the original image data; and means for receiving the user instruction input by the user through the user interface. The user instruction for performing operation of transmitting includes information indicating whether the original image data contains confidential information. When the information indicates that the image data contains confidential information is received, the means for dividing does not generate the dividing information. The means for transmitting transmits the original image data that is not divided to the destination apparatus.

In one example, the present invention may reside in: an information processing apparatus for transmitting original image data. The information processing apparatus includes means for dividing the original image data, which is received through the network, into multiple sets of original image data files according to a predetermined data size. The means for dividing further generates a job ID that uniquely identifies each set of the original image data files each set including at least one original image data file, and registers image data identification information that uniquely identifies each image data file included in each set of the original image data files in association with the job ID. The information processing apparatus further includes means for transmitting the multiple sets of original image data files, set by set, according to the job ID.

In one example, the means for dividing determines the data size used for dividing the original image data according to a user instruction input by a user, network capabilities, or capabilities of a server to which the original image data is transmitted.

In one example, the information processing apparatus further includes: means for displaying a user interface that allows the user to input a user instruction for performing operation of transmitting the original image data; and means for receiving the user instruction input by the user through the user interface. The user instruction for performing operation of transmitting includes information indicating whether the original image data contains confidential information. When the information indicates that the image data contains confidential information is received, the means for dividing does not generate the dividing information. The means for transmitting transmits the original image data that is not divided to the destination apparatus.

In one example, the present invention may reside in an image transmitting system for transmitting original image data, which includes an image processing apparatus and an information processing apparatus connected through a network. The image processing apparatus includes means for scanning an original into the original image data; and means for transmitting the original image data to the information processing apparatus through the network. The information processing apparatus includes means for dividing the original image data into multiple sets of original image data files according to a predetermined data size. The means for dividing further generates a job ID that uniquely identifies each set of the original image data files each set including at least one original image data file, and registers image data identification information that uniquely identifies each image data file included in each set of the original image data files in association with the job ID. The information processing apparatus further includes means for transmitting the multiple sets of original image data files, set by set, according to the job ID.

In one example, the means for dividing determines the data size used for dividing the original image data according to a user instruction input by a user, network capabilities, or capabilities of a server to which the original image data is transmitted.

In one example, the image processing apparatus further includes: means for displaying a user interface that allows the user to input a user instruction for performing operation of transmitting the original image data; and means for receiving the user instruction input by the user through the user interface. The user instruction for performing operation of transmitting includes information indicating whether the original image data contains confidential information. When the information indicates that the image data contains confidential information is received, the means for dividing does not generate the dividing information. The means for transmitting transmits the original image data that is not divided to the destination apparatus.

In one example, the present invention may reside in a method of transmitting original image data, performed by an image processing apparatus. The method includes: scanning an original into the original image data; dividing the original image data into multiple sets of original image data files according to a predetermined data size; generating a job ID that uniquely identifies each set of the original image data files each set including at least one original image data file; registering image data identification information that uniquely identifies each image data file included in each set of the original image data files in association with the job ID; and transmitting the multiple sets of original image data files, set by set, according to the job ID.

In one example, the step of dividing determines the data size used for dividing the original image data according to a user instruction input by a user, network capabilities, or capabilities of a server to which the original image data is transmitted.

In one example, the method further includes: means for displaying a user interface that allows the user to input a user instruction for performing operation of transmitting the original image data; and receiving the user instruction input by the user through the user interface. The user instruction for performing operation of transmitting includes information indicating whether the original image data contains confidential information. When the information indicates that the image data contains confidential information is received, the dividing step of generating the dividing information is not performed. The transmitting steps transmits the original image data that is not divided to the destination apparatus.

In one example, the present invention may reside in a computer executable program which causes an image processing apparatus or an information processing apparatus to perform the above-described method.

In one example, the present invention may reside in a recording medium storing a plurality of instructions which cause an image processing apparatus or an information processing apparatus to perform the above-described method.

What is claimed is:

1. An image processing apparatus connected to a destination apparatus through a network, the image processing apparatus comprising:
   a scan processor unit configured to obtain original image data of an original;
   a controller unit configured to generate dividing information of the original image data according to section size information indicating a size of section image data to be generated from the original image data, classify the original image data into multiple sets of original image data files using the dividing information, and generate a plurality of section image data files with each section image data file including one set of original image data files,
   wherein the dividing information of the original image data includes:
      job identification information for identifying one set of original image data files; and
      image data identification information, to be registered in association with the job identification information, for identifying each one of original image data files that are classified into the one set of original image data files;
   a data transmission unit configured to transmit the plurality of section image data files to the destination apparatus through the network according to the dividing information;
   a display processor configured to display a user interface to a user; and
   a request processor configured to receive a user instruction input by the user through the user interface, wherein when the user instruction received by the request processor includes information indicating that the original image data contains confidential information, the controller unit causes the data transmission unit to transmit the original image data as a single file.

2. The image processing apparatus of claim 1, wherein the section size information defines a threshold value of the size of section image data that is previously determined according to at least one of a user instruction input by a user, capabilities of the network, and capabilities of the destination apparatus.

3. The image processing apparatus of claim 1, further comprising:
   a storage unit configured to store the dividing information of the original image data in association with the original image data.

4. The image processing apparatus of claim 1, wherein the controller unit is further configured to compare a data size of one original image data file with a threshold value of the size of the section image data file to generate a comparison result, and determine whether to generate the job identification information based on the comparison result.

5. The image processing apparatus of claim 4, wherein the dividing information of the original image data further includes:
   total data size information, to be registered in association with the job identification information, which indicates a total data size of the original image data files that are classified into the one set of original image data files, and
   the controller unit compares the total data size with the threshold value of the size of the section image data file to generate a comparison result, and determines whether to generate the job identification information based on the comparison result.

6. The image processing apparatus of claim 1, wherein the dividing information of the original image data further includes:
   total number property information indicating a total number of the plurality of section image data files generated from the original image data; and
   section number property information for identifying each one of the plurality of section image data files generated from the original image data.

7. An image processing system, comprising:
   an image processing apparatus configured to scan an original into original image data; and
   an information processing apparatus connected to the image processing apparatus through a network and configured to receive the original image data from the image processing apparatus, the information processing apparatus including:
      a controller unit configured to generate dividing information of the original image data according to section size information indicating a size of section image data to be generated from the original image data, classify the original image data into multiple sets of original image data files using the dividing information, and generate a plurality of section image data files with each section image data file including one set of original image data files,
      wherein the dividing information of the original image data includes:
         job identification information for identifying one set of original image data files; and
         image data identification information, to be registered in association with the job identification information, for identifying each one of original image data files that are classified into the one set of original image data files; and a data transmission unit configured to transmit the plurality of section image data files to a destination apparatus through the network according to the dividing information, wherein the information processing apparatus further includes:

a display processor configured to display a user interface to a user; and a request processor configured to receive a user instruction input by the user through the user interface, wherein when the user instruction received by the request processor includes information indicating that the original image data contains confidential information, the controller unit of the information processing apparatus causes the data transmission unit to transmit the original image data as a single file.

8. The image processing system of claim 7, wherein the section size information defines a threshold value of the size of section image data file that is previously determined according to at least one of a user instruction input by a user, capabilities of the network, and capabilities of the destination apparatus.

9. The image processing system of claim 7, wherein the dividing information of the original image data further includes:

total number property information indicating a total number of the plurality of section image data files generated from the original image data; and section number property information for identifying each one of the plurality of section image data files generated from the original image data.

10. The image processing system of claim 9, wherein the controller unit is further configured to transmit the dividing information of the original image data in association with the original image data.

11. A method of transmitting original image data to a destination apparatus through a network, the method comprising:

scanning an original into the original image data;

generating dividing information of the original image data according to section size information indicating a size of section image data to be generated from the original image data;

classifying the original image data into multiple sets of original image data files using the dividing information;

generating a plurality of section image data files with each section image data file including one set of original image data files;

transmitting the plurality of section image data files to the destination apparatus through the network according to the dividing information, wherein the dividing information of the original image data includes:

job identification information for identifying one set of original image data files; and image data identification information, to be registered in association with the job identification information, for identifying each one of original image data files that are classified into the one set of original image data files;

displaying a user interface to a user;

receiving a user instruction input by the user through the user interface; and transmitting the original image data as a single file to the destination apparatus when the user instruction includes information indicating that the original image data contains confidential information.

12. The method of claim 11, wherein the section size information defines a threshold value of the size of section image data that is previously determined according to at least one of a user instruction input by a user, capabilities of the network; and capabilities of the destination apparatus.

* * * * *